(12) United States Patent
Weyer

(10) Patent No.: US 11,492,064 B1
(45) Date of Patent: Nov. 8, 2022

(54) METHOD AND APPARATUS FOR NESTING A SUSPENSION BICYCLE FRAME

(71) Applicant: Frank Michael Weyer, Los Angeles, CA (US)

(72) Inventor: Frank Michael Weyer, Los Angeles, CA (US)

( * ) Notice: Subject to any disclaimer, the term of this patent is extended or adjusted under 35 U.S.C. 154(b) by 0 days.

(21) Appl. No.: 17/699,078

(22) Filed: Mar. 19, 2022

(51) Int. Cl.
*B62K 25/20* (2006.01)
*B62K 15/00* (2006.01)

(52) U.S. Cl.
CPC ............ *B62K 25/20* (2013.01); *B62K 15/006* (2013.01)

(58) Field of Classification Search
CPC .............................. B62K 15/006; B62K 25/20
USPC ......................................................... 280/284
See application file for complete search history.

(56) References Cited

U.S. PATENT DOCUMENTS

| 2006/0163837 A1* | 7/2006 | Sutherland | B62K 15/006 280/284 |
| 2006/0197306 A1* | 9/2006 | O'Connor | B62K 25/286 280/284 |

* cited by examiner

*Primary Examiner* — Minnah L Seoh
*Assistant Examiner* — Felicia L. Brittman
(74) *Attorney, Agent, or Firm* — Techcoastlaw; Frank Michael Weyer

(57) ABSTRACT

The present invention is a swingarm suspension bicycle frame that is designed to allow nesting of the swingarm within the main frame of the bicycle frame, thereby allowing the bicycle frame to be packed and shipped in a smaller package than prior art bicycles of similar frame and wheel size, and a method for nesting such a suspension bicycle frame. In one or more embodiments, the pivot bearing to which the pivot point of the swingarm is attached is positioned along the seat support member of the main frame at a distance from the bottom of the bracket mount of the seat support member that is at least as great as the distance from the pivot point of the swingarm to the shock absorber mounting point of the swingarm. Such a location allows the swingarm to be nested within the main frame of the bicycle frame.

8 Claims, 10 Drawing Sheets

METHOD AND APPARATUS FOR NESTING A SUSPENSION BICYCLE FRAME

CROSS-REFERENCE TO RELATED PATENT APPLICATIONS

The present application claims the benefit of and priority to and from U.S. Provisional Patent Application No. 63/233,277 filed Aug. 15, 2021, which is incorporated in its entirety by reference herein.

FIELD OF THE INVENTION

The present invention relates to the field of suspension frames for bicycles.

BACKGROUND OF THE INVENTION

FIG. 1 shows a traditional prior art rigid (non-suspension) bicycle frame 100. Prior art bicycle frame 100 has two generally triangular portions. The front triangular portion, sometimes referred to as the "main triangle," includes a down tube 110, a seat tube 120, a top tube 130, and a head tube 140 to which a front fork 150 is mounted. The rear triangular portion, sometimes referred to as the "rear triangle," includes the seat tube 120, left and right chain stays 160, and left and right seat stays 170.

FIG. 2 shows an example of a prior art suspension bicycle frame 200. Prior art suspension bicycle frame 200, like prior art rigid frame 100 of FIG. 1, includes a main triangle that includes a down tube 210, a seat tube 220, a top tube 230, and a head tube 240. Instead of a rear triangle, however, bicycle frame 200 includes a swingarm 250 that is pivotally mounted to down tube 210, typically using a pivot bearing, at a pivot point 260. The movement of swingarm 250 around pivot point 260 is restrained and dampened by a shock absorber 270. Commercial examples of bicycles that include a swingarm suspension like bicycle frame 200 include the "Five" models from Orange Mountain Bikes Limited of West Yorkshire, England and the "Atroz" models from Diamondback Bicycles of Kent, Wash.

FIG. 3 shows a perspective view of the swingarm 250 of FIG. 2. The construction of swingarm 250 is typical of swingarms used in swingarm suspension bicycle frames. It includes right and left arms 300 and 310, respectively, which are typically approximately mirror images of each other. Arms 300 and 310 are typically made of metal, such as aluminum, or of a composite material, such as a carbon fiber composite. They may me solid, or have hollow or partially hollow cores. Arms 300 and 310 each include front bearing mount openings 340 and 350, respectively, and rear wheel mount openings 370 and 380, respectively. Arms 300 and 310 are rigidly connected to one another by connection structure 330 to form a rigid integrated unit. In the embodiment of FIG. 3, connection structure 330 is implemented as a round rod whose ends are fixedly attached to each of arms 300 and 310, for example by welding if arms 300 and 310 are constructed of metal or by bonding if they are constructed of a composite material. In other prior art embodiments, connecting structure 330 may include additional structures joining arms 300 and 310, such as, for example, a metal or composite plate across the front portions of arms 300 and 310. Arms 300 and 310 must be joined by connection structure 330 into a rigid integrated unit to prevent flexing and resulting undesirable wheel wobble that would occur if each arm 300 and 310 could move independently of each other about front pivot point 260 of FIG. 2. Further, connecting structure 330 must be located towards the front of arms 300 and 310 so as not to interfere with the rear wheel when it is mounted to wheel mount openings 370 and 380.

In the embodiment of FIG. 3, connecting structure 330 includes a shock absorber mount 360 for attaching to one end of shock absorber 270 of FIG. 2.

In prior art swingarm suspension bicycle frames, as shown in the embodiment of FIG. 2, pivot point 260 around which swingarm 250 pivots is placed at approximately the same vertical height as the center 290 of rear wheel 280. This is so that, when rear wheel 280 moves up and down in response to road shocks, center 290 of rear wheel 280 moves approximately vertically up and down, thereby minimizing chain stretch and an effect sometimes referred to as "pedal jerk" that can occur if the movement of center 290 is such that it moves in a manner that significantly changes the spacing between center 290 of wheel 280 and the center axis of chain wheel 295.

FIG. 4 is an image generated by a publicly available software program called "Linkage" available at www.bike-checker.com. Linkage is bicycle analysis and design software that models, analyses and calculates movements and forces of different bicycle suspension geometries. Linkage allows a user to model and analyze a wide variety of bicycle suspension frame geometries. Linkage models for over 1500 bicycle suspension frame geometries are available at the Linkage website.

FIG. 4 shows part of one of the output images of the Linkage program for a Linkage model of the "Orange Five" bicycle. The Orange Five bicycle has a swingarm frame geometry similar to that of the swingarm suspension frame embodiment shown in FIGS. 2 and 3. The Linkage model 400 of the Orange Five bicycle shown in FIG. 4 includes a swingarm 410 pivotably attached to down tube 415 of front frame triangle 405 at pivot point 420. Movement of swingarm 410 about pivot point 420 is restrained by shock absorber 450 mounted between swingarm 410 and down tube 415. As in the embodiment of FIG. 2, the height of pivot point 420 is close to the height of center 460 of wheel 430 when wheel 430 is mounted to swingarm 410. Arc 440 is the path of movement of the center 460 of wheel 430 as swingarm 410 pivots about pivot point 420 as calculated by the Linkage program. As shown in FIG. 4, arc 440 is approximately vertical, so that the distance between center 460 of wheel 430 and the center of rotation of chainwheel 425 does not greatly change as swingarm 410 moves to absorb shocks within the range of movement permitted by shock absorber 450.

Persons of ordinary skill in the art of bicycle suspension frame design have long sought to design suspension frames so as to limit chain stretch and pedal jerk. See, for example, the teaching of U.S. Pat. Nos. 5,332,246, 5,509,679, 7,521,743, 7,909,347, 8,066,297, 8,272,657, 9,302,732 and 10,377,442. Heretofore, persons of ordinary skill in the art have not recognized any benefit in purposefully designing a suspension bicycle frame in a configuration that causes an increase in chain stretch and resulting pedal jerk.

SUMMARY OF THE INVENTION

The present invention is a swingarm suspension bicycle frame that is not designed to minimize chain stretch and pedal jerk as in the prior art, but instead is designed to allow nesting of the swingarm within the main frame (e.g. the main triangle) of the bicycle frame, thereby allowing the bicycle frame to be packed and shipped in a smaller package than prior art bicycles of similar frame and wheel size, and a method for nesting such a suspension bicycle frame. In one or more embodiments, the pivot bearing to which the pivot point of the swingarm is attached is positioned along the seat support member of the main frame at a distance from the bottom of the bracket mount of the seat support member that is at least as great as the distance from the pivot point of the swingarm to the shock absorber mounting point of the swingarm. Such a location results in increased chain stretch and pedal jerk as compared to swingarm suspension bicycle frames of the prior art, but allows the swingarm to be nested within the main frame of the bicycle frame.

DETAILED DESCRIPTION OF THE INVENTION

In the following description, numerous specific details are set forth to provide a thorough description of the invention. However, it will be apparent to those of ordinary skill in the art that the invention may be practiced without these specific details. In other instances, well-known features have not been described in detail so as not to obscure the invention.

One of the disadvantages of full size prior art rigid and suspension bicycle frames is the size of box or other container needed to ship them ("full size" as used herein means bicycle frames that are made to accept wheels 26 inches and larger). Even though use of materials such as aluminum and carbon fiber composites has allowed the construction of light weight bicycle frames, shipping costs remain high because of the bulky shipping containers that are required. That has resulted in high shipping costs when a bicycle is transported, for example when shipped from a manufacturer to a dealer or customer, or by the owner after purchase. That is a particular disadvantage when a bicycle owner desires to take the bicycle along on an airline trip. Prior art full-size bicycle frames have heretofore not been able to fit into a container that meets the checked-luggage size limitation of 62 inches (sum of length, width, and depth), even when easily removable components such as the seat, wheels, handlebars, pedals, and in some cases cranks, have been removed. As a result, a bicycle owner who seeks to take a full size bicycle of the prior art along on an airplane trip is forced to pay oversize baggage surcharges that can amount to several hundred dollars per trip.

Figure 1:
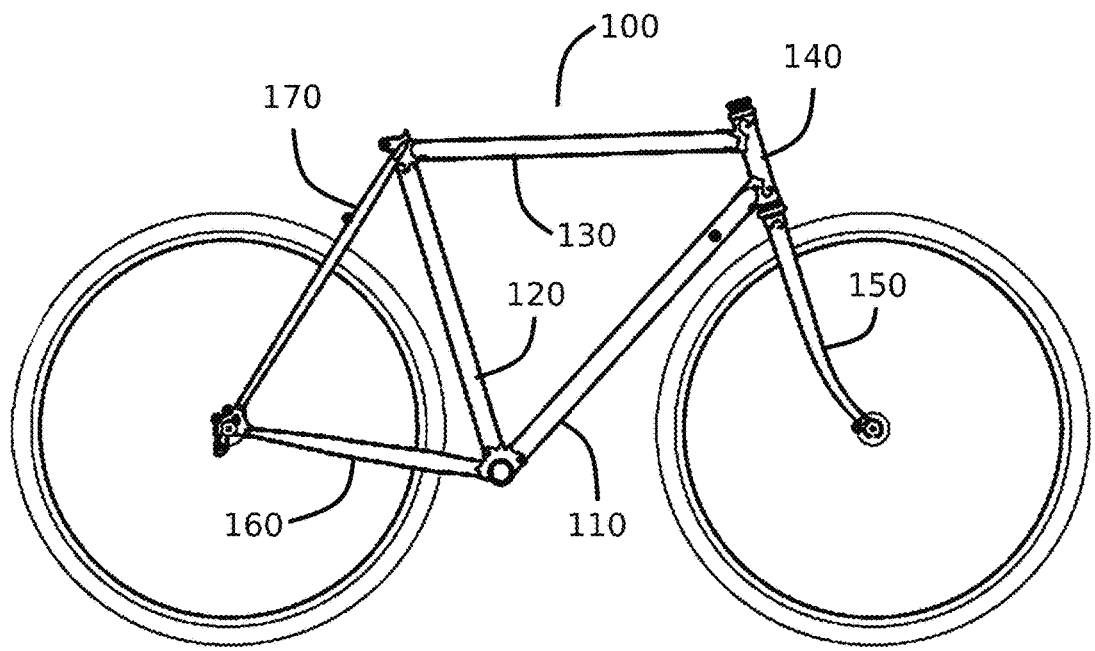
FIG. 1 is a side view of a rigid, non-suspension bicycle frame of the prior art.
Figure 2:
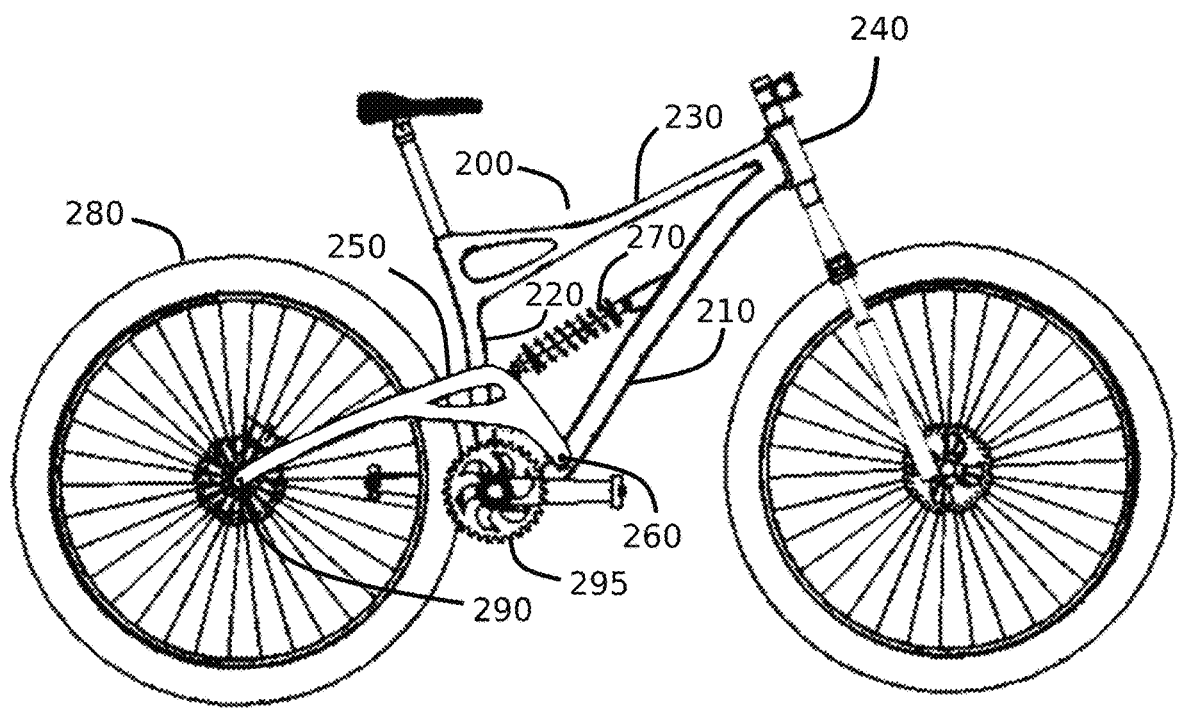
FIG. 2 is a side view of a prior art bicycle with a swingarm suspension frame.
Figure 3:
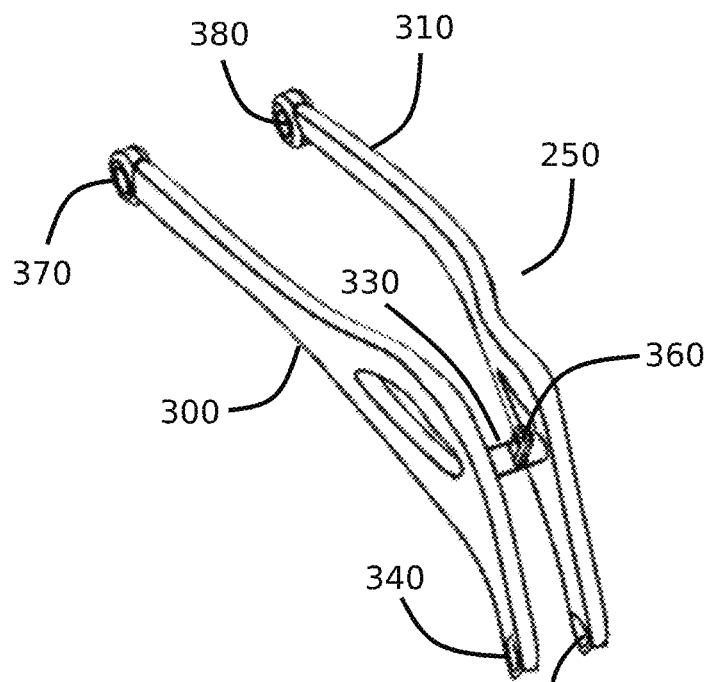
FIG. 3 is a perspective view of the swingarm of the bicycle of FIG. 2.
Figure 5:
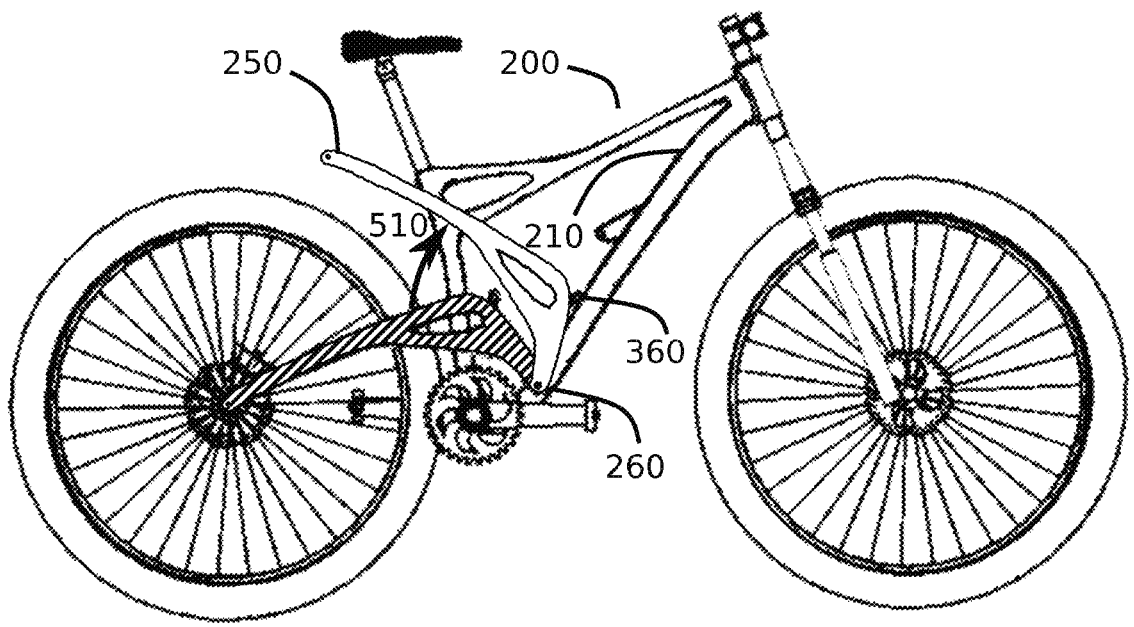
FIG. 5 is a side view of the bicycle of FIG. 2 showing the extent to which the swingarm can be rotated forward around its pivot bearing.

Full size bicycles of the prior art that have swingarm suspension bicycle frames can be shipped in somewhat smaller containers than bicycles with rigid frames because the swingarm can be rotated up and forward around the pivot bearing by which the swingarm is mounted to the frame's main triangle after the rear wheel and the shock absorber mounting bolt are removed. However, because the swingarm pivot point is positioned low on the main triangle in the prior art to reduce chain stretch and resulting pedal jerk, the range of such rotation is limited by the connecting structure that connects the left and right swingarms together. As shown in FIG. 5, for example, swingarm 250 of swingarm suspension bicycle frame 200 of FIG. 2 can only be rotated about 30 to 40 degrees (indicated by arrow 510 in FIG. 5) about pivot point 260 before the shock absorber mount 360 of swingarm 250 hits down tube 210, preventing further movement.

Figure 4:
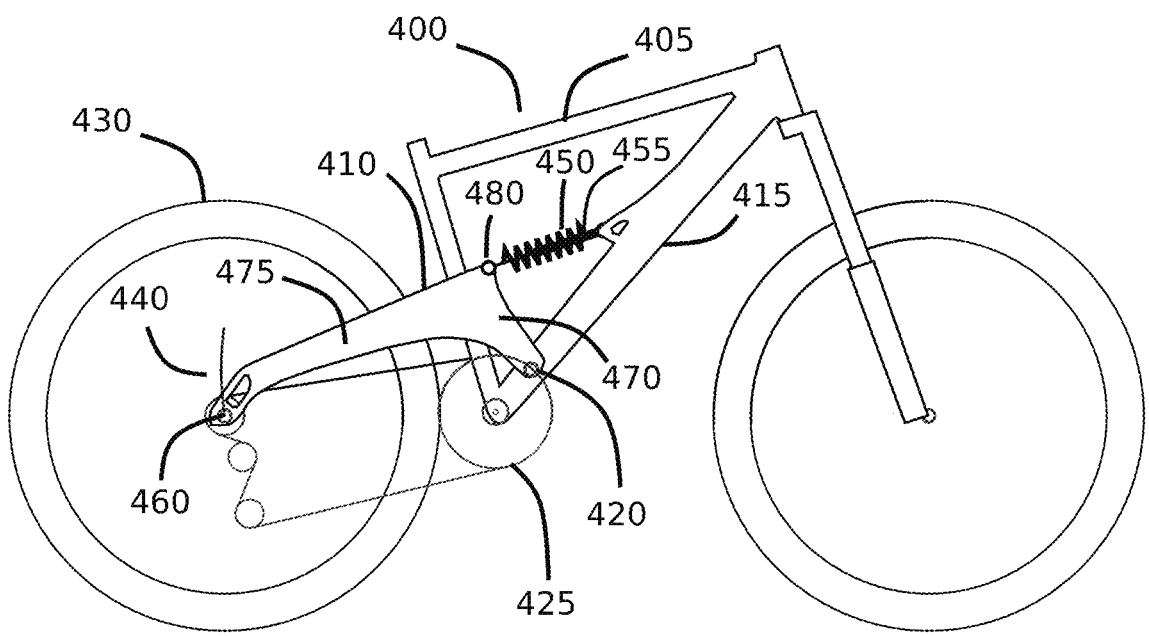
FIG. 4 is a side view of a computer model of the "Orange Five" bicycle frame and suspension system of the prior art.
Figure 6:
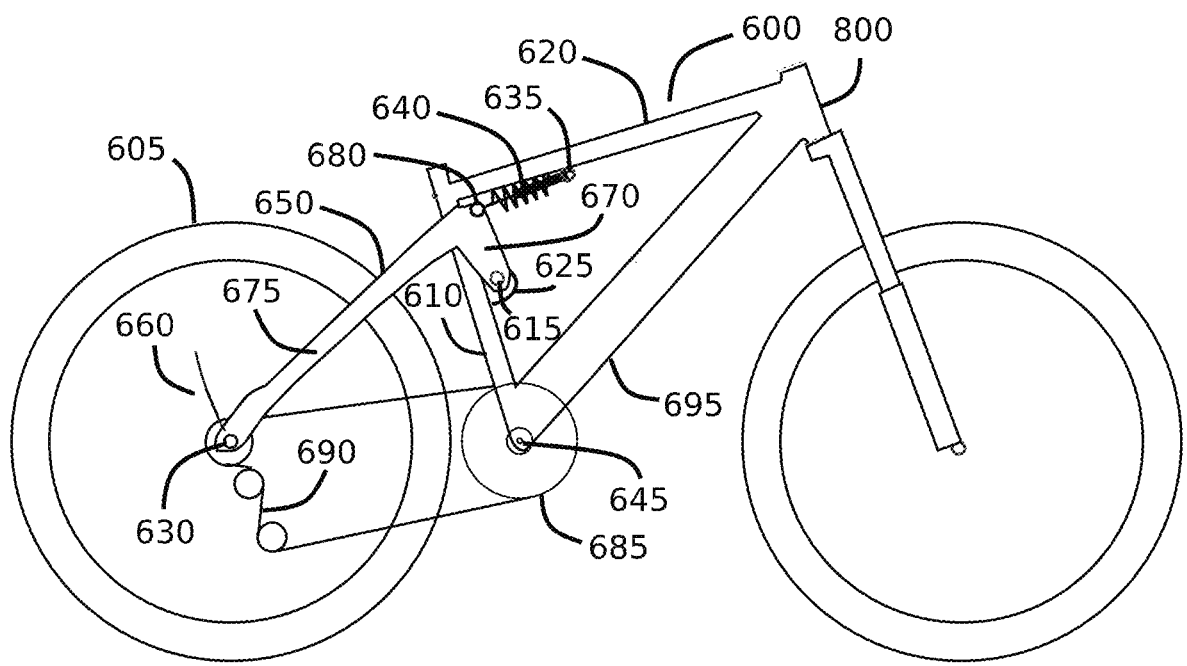
FIG. 6 is a side view of a computer model of an embodiment of the bicycle frame of the invention.

FIG. 6 shows an embodiment of a bicycle frame 600 of the invention. The embodiment of FIG. 6 was created by modifying the computer model of the Orange Five bicycle frame shown in FIG. 4 using the Linkage software, which allows a user to edit a model to modify the linkage geometry of the modeled frame. Comparing FIG. 6 to FIG. 4, it can be seen that one of the changes made to the computer model of the Orange Five bicycle frame 400 of FIG. 4 includes moving the pivot point 420 of the swingarm 410 from a location low on the down tube 415 to a location on a swingarm bearing mount structure 625 mounted to seat tube 610 (for example by welding or composite bonding) about midway along seat tube 610. Another change made from bicycle frame 400 of FIG. 4 is mounting the fixed end 455 of shock absorber 450 to a mounting structure mounted to top tube 620 instead of to down tube 415. Finally, the shape and dimensions of swingarm 650 of the embodiment of FIG. 6 differ from those of swingarm 410 of FIG. 4. The front short leg 670 of swingarm 650 is shorter than the front short leg 470 of swingarm 410 to accommodate the shorter distance between pivot point 615 and shock absorber mounting point 680, as compared to the distance between pivot point 420 and shock absorber mounting point 480. In addition, the angle between front short leg 670 and rear long leg 675 of swingarm 650 is smaller than the angle between front short leg 470 and rear long leg 475 of swingarm 410. Also, the length of rear long leg 675 is appropriate to accommodate the distance between shock absorber mounting point 680 and rear wheel mounting point 630.

Figure 7:
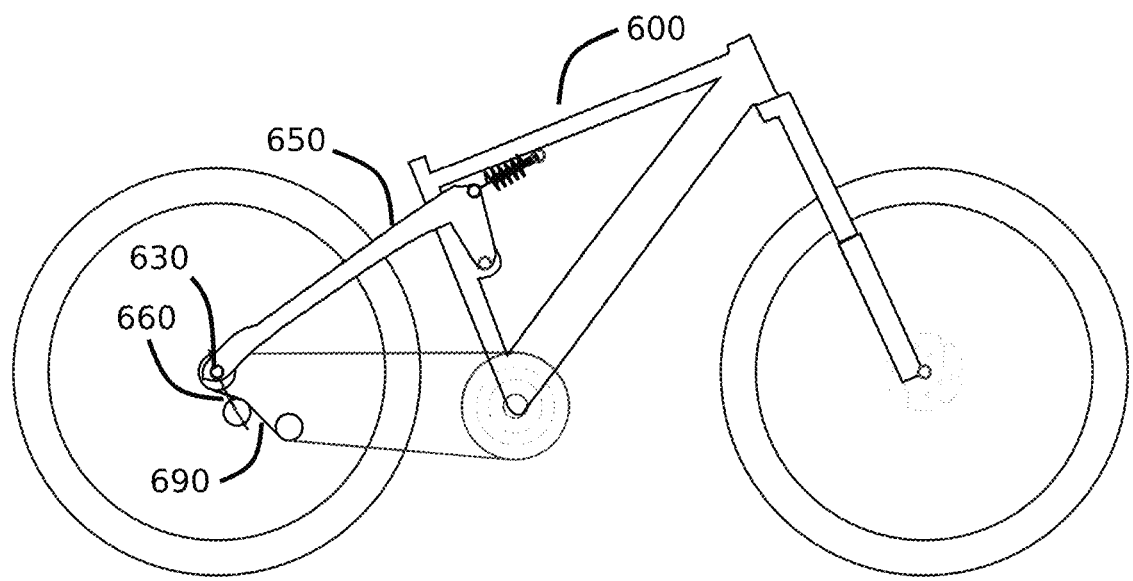
FIG. 7 is a side view of a computer model of the embodiment of the bicycle frame of the invention of FIG. 6 showing the suspension in a compressed condition.

Arc 660 shows the path of movement of rear wheel mounting point 630 when swingarm 650 moves upward as road shocks are absorbed by the suspension system formed by swingarm 650 and shock absorber 640. Arc 660 is not approximately vertical like arc 440 of FIG. 4, but is angled toward the rear of bicycle frame 600. This has the result of increasing the distance between rear wheel mounting point 630 and the center 645 of chain wheel 685 when the suspension moves upward, causing chain stretch and pedal jerk. FIG. 7 is an image generated by the Linkage software program showing the chain stretch resulting from upwards travel of 100 mm of rear wheel mounting point 630 of swingarm 675 of bicycle frame 600. The chain stretch is substantial, as indicated by nearly horizontal orientation of rear derailleur chain tensioner 690, compared to the more vertical orientation when the suspension is not compressed shown in FIG. 6. To reduce chain stretch for the embodiment of FIGS. 6 and 7, the spring force of shock absorber 640 can be increased, which will effectively reduce chain stretch, but also reduce the amount of suspension travel.

Figure 8:
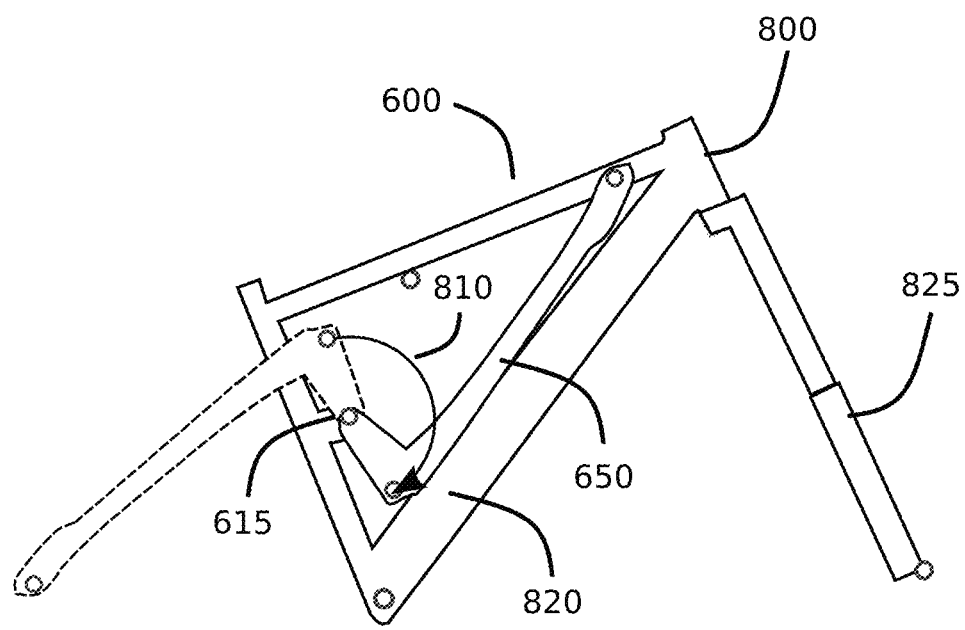
FIG. 8 is a side view of the embodiment of the bicycle frame of the invention of FIG. 6 showing the swingarm rotating to a nested position within the main triangle.
Figure 9:
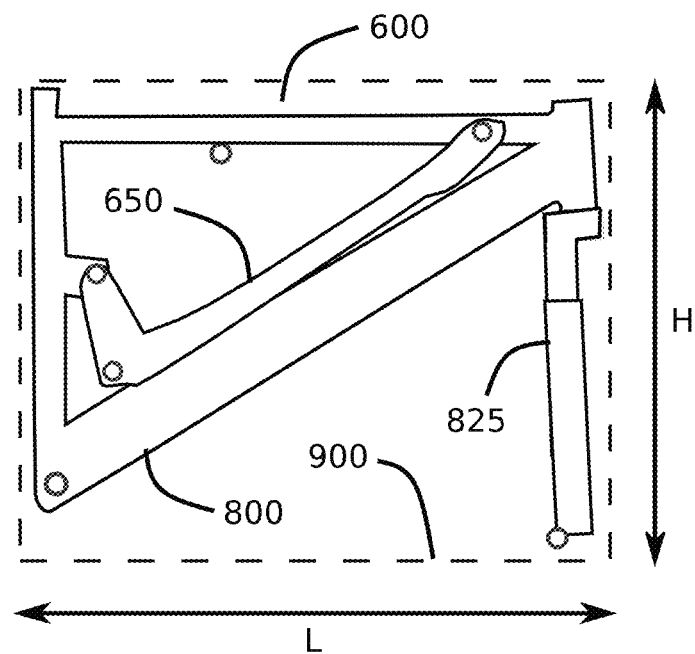
FIG. 9 is a side view of the embodiment of the bicycle frame of the invention of FIG. 6 showing the swingarm rotating to a nested position within the main triangle and with the front fork rotated and compressed.

The advantages of the swingarm suspension frame of the present invention are shown in FIGS. 8 and 9. FIG. 8 shows how swingarm 650 of swingarm suspension frame 600 of the invention can be rotated so as to nest within the outside perimeter of main triangle 800 (which includes seat tube 610, top tube 620 and down tube 695 of the embodiment of FIG. 6) after the wheels, shock absorber, and crankset have been removed. In the embodiment of FIG. 8, as indicated by arrow 810, swingarm 650 can be rotated around pivot point 615 approximately 180 degrees before the connecting structure of swingarm 650 contacts down tube 820 of main triangle 800, preventing further movement.

FIG. 9 shows the resulting configuration of frame 600 after swingarm 650 has nested within main triangle 800. In addition, in FIG. 9, front fork 825 has been rotated so as to face backwards and has been compressed to its maximum amount of suspension travel, which is easiest if front fork 825 is an air suspension fork that whose effective spring force is reduced once the air pressure is released. As shown by outline 900, in the embodiment of FIG. 9, nesting swingarm suspension bicycle frame 600 can fit within a rectangular enclosure having dimensions L by H, In one or more embodiments, the dimensions of main triangle 800 are selected such that L and H are each less than 26 inches, which allows frame 600 to be packed into a case having 26×26×10 inches, which meets typical airline non-oversize checked baggage size requirements (length plus width plus thickness less than 62 inches).

Figure 10:
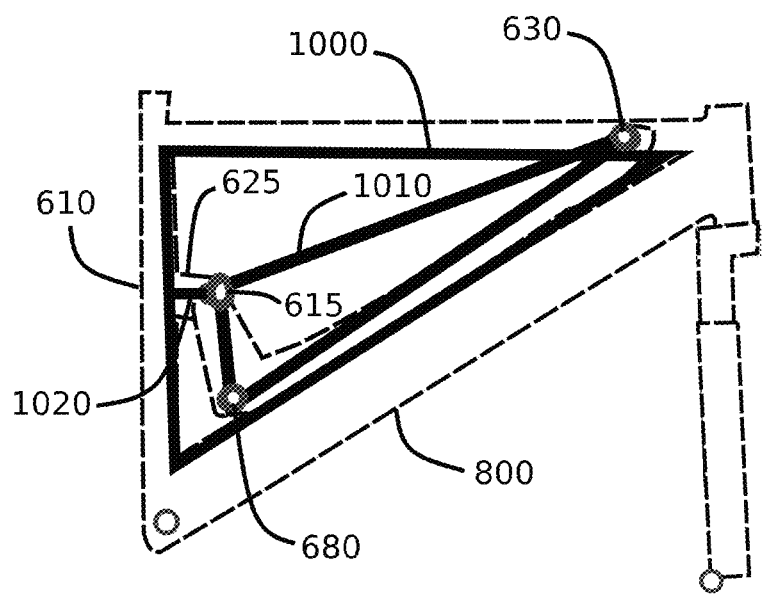
FIG. 10 is a side view of the embodiment of the bicycle frame of the invention of FIG. 6 showing a schematic representation of the main triangle and swingarm.

FIG. 10 shows a schematic representation of main triangle 800 and swingarm 615 that is useful for illustrating relevant parameters of embodiments of the swingarm suspension frame of the invention that include a main triangle, like main triangle 800 of the embodiment of FIG. 6. In FIG. 10, triangle 1000 schematically represents the inside perimeter of main triangle 800, and triangle 1010 schematically represents swingarm 615, the vertices of triangle 1010 being pivot point 615, rear wheel mounting point 630, and shock absorber mounting point 680. Triangle 1010 is thus a generic representation of a swingarm, which can have a variety of shapes and forms, but which must provide a rigid supporting structure for the three features that form the vertices of triangle 1010, namely pivot point 615, rear wheel mounting point 630, and shock absorber mounting point 680.

Figure 11:
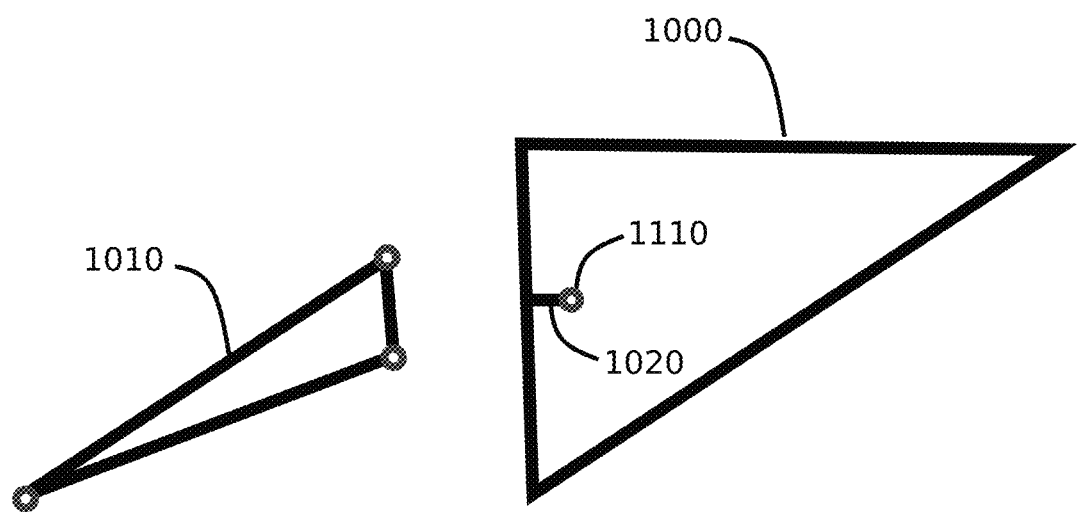
FIG. 11 is a side view of the invention of FIG. 6 showing a schematic representation of the main triangle and swingarm.

FIG. 11 separately depicts the schematic representations of main triangle 1000 and swingarm triangle 1010 of FIG. 10. As shown in FIG. 11, main triangle 1000 includes a line segment 1020 that schematically represents swingarm bearing mount structure 625. Swingarm bearing 1110 is disposed at the end of line segment 1020. The length of line segment 1020 thus represents the distance that pivot point 615 is offset from seat tube 610 in the embodiment of FIG. 6. In other embodiments, pivot point 615 may be disposed on seat tube 610 itself, in which case the length of line segment 1020 would be zero.

Figure 12:
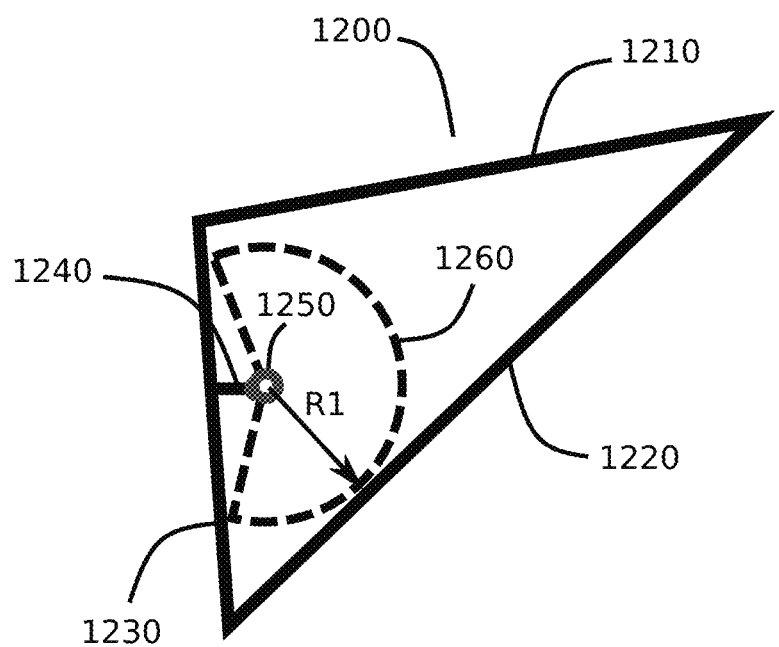
FIG. 12 is a side view of a schematic representation of a general embodiment of a main triangle of the invention.

FIG. 12 is a schematic representation of a general embodiment of a main triangle 1200 of the invention which demonstrates some of the criteria required to construct a nesting swingarm suspension bicycle frame according to the invention. Main triangle 1200 includes top tube 1210, down tube 1220 and seat tube 1230. Main triangle 1200 also includes a pivot bearing support 1240 mounted to seat tube 1230 and a pivot bearing 1250 mounted to pivot bearing support 1240. Main triangle 1200, in the same way as main triangle of bicycle frames of the prior art, can have any of a variety of sizes and shapes, depending on the size of the wheels to be used, the size of the rider for which the frame is intended, etc.

Item 1260 in FIG. 12 is a circular arc centered is at pivot bearing 1250. It has a radius R1, which is the maximum radius of arc 1260 that fits inside main triangle 1200.

Figure 13:
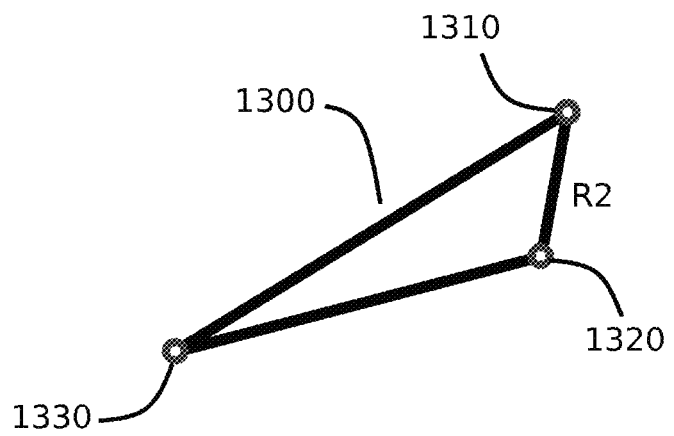
FIG. 13 is a side view of a schematic representation of a general embodiment of a swingarm of the invention.

FIG. 13 is a schematic representation of a general embodiment of a swingarm 1300 of the invention. Swingarm 1300 is depicted as a triangle whose vertices are shock absorber mounting point 1310, pivot point 1320, and rear wheel mounting point 1330. Although the schematic representation of swingarm 1300 is depicted as a triangle, those of skill in the art will appreciate that swingarm 1300 can have any shape or configuration that encompasses those three points, including, for example, configurations similar to those of swingarm 250 of FIG. 2 or swingarm 475 of FIG. 4.

For certain configurations of swingarm 1300, shock absorber mounting point 1310 will be the part of the front part of swingarm 1300 (the part that faces towards the front wheel of the bicycle when mounted to the pivot bearing of the main triangle) that would first contact the main triangle when swingarm 1300 pivots forwards about the pivot bearing of the main triangle. That is, for the embodiment of swingarm 1300 of FIG. 13, shock absorber mount 1310 is the point of first contact with the main triangle. That means, for example, if pivot point 1320 of swingarm 1300 were mounted to pivot bearing 1250 of main triangle 1200 of FIG. 12, the distance R2 between pivot point 1320 and shock absorber mounting point 1310 of swingarm 1300 of FIG. 13 (i.e. the point of first contact) should not be greater than radius R1 of FIG. 12 for swingarm 1300 to be able to rotate the maximum extent around pivot bearing 1250 so as to nest within main triangle 1200 according to the invention.

Figure 14:
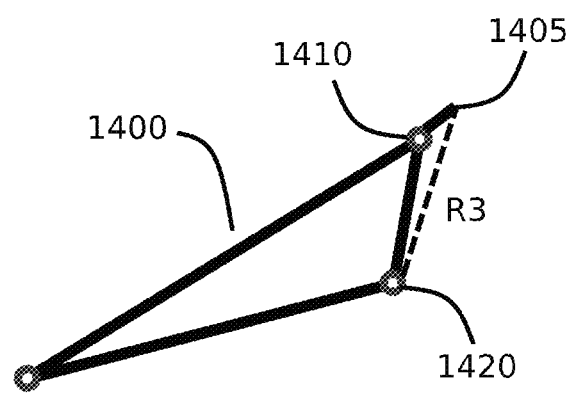
FIG. 14 is a side view of a schematic representation of a general embodiment of a swingarm of the invention.

FIG. 14 shows a schematic representation of an embodiment of a swingarm 1400 in which the configuration of swingarm 1400 is such that there is a different point of first contact 1405 than shock absorber mounting point 1410 that first contacts the main triangle when swingarm 1400 pivots about the main triangle's pivot bearing. Point of first contact 1405 may for example be a portion of the connecting structure that connects the left and right portions of swingarm 1400. Thus, if pivot point 1420 of swingarm 1400 were mounted to pivot bearing 1250 of main triangle 1200 of FIG. 12, the distance R3 between pivot point 1420 and point of first contact 1405 of swingarm 1400 of FIG. 14 should not be greater than radius R1 of FIG. 12 for swingarm 1400 to be able to rotate the maximum extent around pivot bearing 1250 so as to nest within main triangle 1200 according to the invention.

In general, for a swingarm to be able to nest within a main triangle according to the invention, the distance between its pivot point at which it is mounted to the pivot bearing of the main triangle and the swingarm's point of first contact (whether it is the shock absorber mounting point or some other point) should be less than the maximum radius of an arc, centered at the pivot bearing of the main triangle to which the swingarm is mounted, that can inscribe the top tube and down tube of the main triangle. This distance will be referred to hereinafter as the "first contact distance."

Looking again at FIG. 12, it is apparent that the radius R1 of inscribed arc 1260 in the embodiment of main triangle 1200 of FIG. 12 would be greater if pivot bearing 1250 were mounted closer to, and in the limiting case mounted directly to, seat tube 1230.

Figure 15:
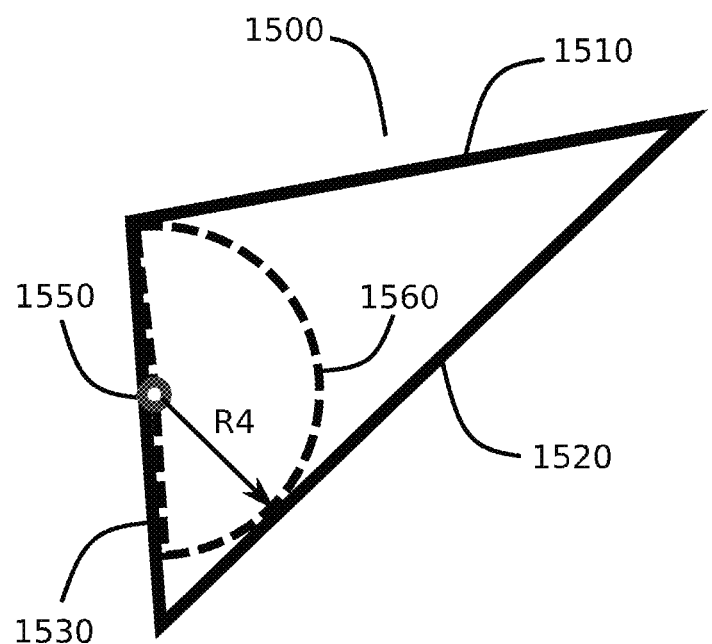
FIG. 15 is a side view of a schematic representation of a general embodiment of a main triangle of the invention.

FIG. 15 shows a schematic representation of a main triangle 1500 in which pivot bearing 1550 is mounted directly to seat tube 1530 of main triangle 1500. Comparison with FIG. 12 shows that the radius R4 of inscribed arc 1560 of the embodiment of FIG. 15 is greater than radius R1 of inscribed arc 1260 of the embodiment of FIG. 12.

Another aspect that is apparent from FIG. 15 is that R4 has a maximum value when the perpendicular distance between down tube 1520 and pivot bearing 1550 is approximately equal to the distance between pivot bearing 1550 and the intersection of top tube 1510 with seat tube 1530. That point can be easily identified from the geometry of any particular main triangle of a bicycle frame.

Looking back at FIG. 6, it can be seen that swingarm 650 acts as a lever arm that transmits the generally upward force exerted by rear wheel 605 into the more horizontal force transmitted by shock absorber mounting point 680 to shock absorber 640. Because the distance DS between pivot point 615 and shock absorber mounting point 680 is shorter than the distance DW between rear wheel mounting point 630 and pivot point 615, the force FS on shock absorber 640 is greater than the force FW exerted by rear wheel 605 on rear wheel mounting point 630, the ratio of FS/FW being proportional to DW/DS. The response of the suspension formed by swingarm 650 and shock absorber 640 is dependent among other things on the spring rate of shock absorber 640 and force FS. It is at times desirable that force FS not exceed a certain limit, dependent for example on the spring rate of shock absorber 640. For that to occur, there is a minimum desired value of distance DS, which, for a given configuration of a swingarm such as swingarm 1400 of FIG. 14, determines a minimum desired value for the first contact distance of the swingarm (referred to herein as "the minimum desired value" or "MDV"), which may be greater than DS depending on where on a particular swingarm the point of first contact is located.

Depending on the specific dimensions of a particular main frame, the MDV may be less than, equal to, or greater than the radius of the maximum radius of the largest inscribed arc centered at the pivot bearing of a particular main frame (e.g. R4 in the embodiment of FIG. 15).

Considering again main frame 1500 of FIG. 15, if the MDV is greater than R4, that desired value cannot be achieved with the existing main triangle geometry, and either the seat tube length needs to be increased or a stiffer shock absorber used.

If the MDV is equal to R4, then pivot bearing 1550 would need to be mounted to seat tube 1530 at the location shown in FIG. 15, i.e. such that the perpendicular distance between down tube 1520 is approximately equal to the distance between pivot bearing 1550 and the intersection of top tube 1510 with seat tube 1530.

If the MDV is less than to R4, then pivot bearing 1550 can be mounted either higher or lower on seat tube 1530 than the location shown in FIG. 15. It will be recalled that it in a swingarm bicycle suspension system, chain stretch and pedal jerk increase with increased height of pivot bearing 1550 on seat tube 1530. Accordingly, if the MDV is less than R4, it is desirable to lower the position of pivot bearing 1550 as compared to the position shown in FIG. 15.

Figure 16:
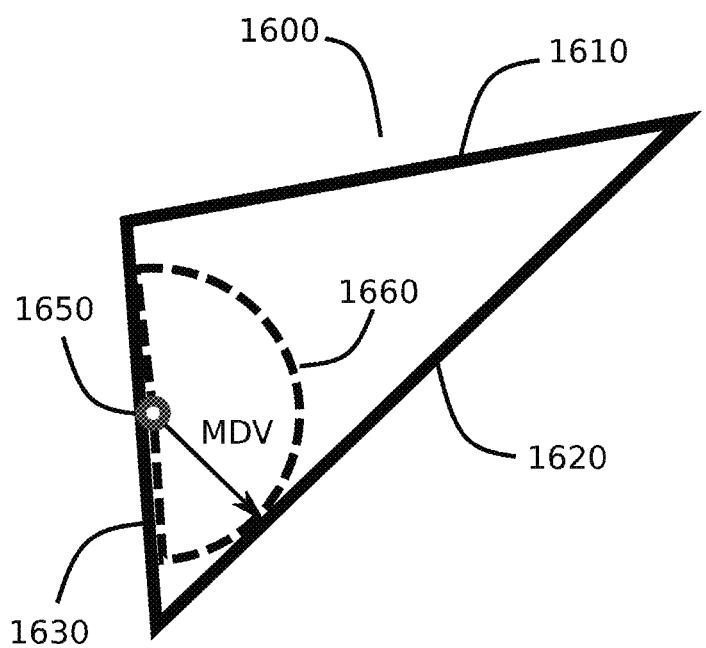
FIG. 16 is a side view of a schematic representation of a general embodiment of a main triangle of the invention.

FIG. 16 shows an embodiment of a main triangle 1600 for which the MDV is less than R4. In the embodiment of FIG. 16, pivot bearing 1650 is mounted to seat tube 1630 at the approximate location at which the perpendicular distance from down tube 1620 to pivot bearing 1650 is approximately equal to the MDV. That is the lowest location at which pivot bearing 1650 can be mounted to allow a swingarm having a distance from its pivot point to its point of first contact equal to the MDV to nest within main triangle 1600 according to the invention.

The term "main triangle" has been used herein to refer to the main part of a swingarm suspension bicycle frame to which the front fork and swingarm are mounted. A more generic term for that portion of a bicycle frame is "main frame," which includes both what has been referred to as "main triangles" that feature a generally triangular arrangement of a top tube, seat tube, and down tube, as well as alternative configurations, for example, frames that do not feature a down tube, but instead feature enlarged and strengthened top and seat tubes. Such main frames may, for example, be formed of metal or of composite materials, such as a carbon fiber composite.

Figure 17:
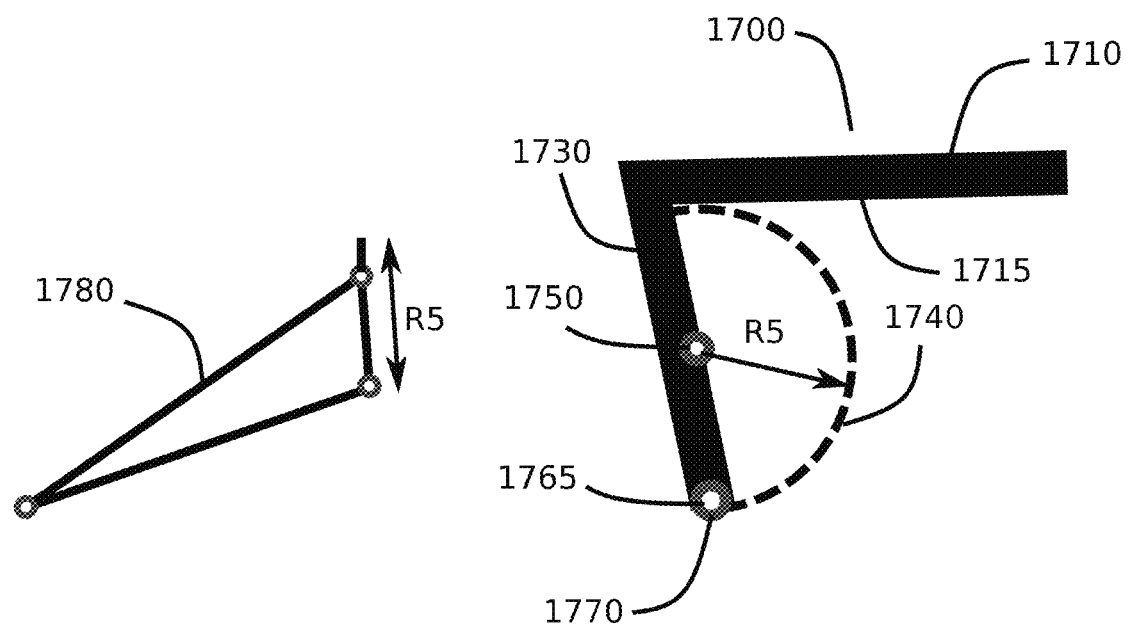
FIG. 17 is a side view of a schematic representation of a general embodiment of a main frame and swingarm of the invention.

FIG. 17 shows how the nesting swingarm of the present invention can be implemented on a main frame 1700 that does not include a down tube. In the embodiment of FIG. 17, main frame 1700 includes a top member 1710 (which may or may not be in the form of a tube) and a seat support member 1730 (which also may or may not be in the form of a tube). A bottom bracket mount 1765 is disposed at the bottom of seat support member 1730. A pivot bearing 1750 is also mounted to seat support member 1730.

For a main frame like main frame 1700 of the embodiment of FIG. 17, the limiting boundaries for inscribed arc 1740 are the bottom 1715 of top member 1710 and the bottom 1770 of bottom bracket mount 1765. As shown in FIG. 17, the radius R5 of the largest inscribed arc centered at pivot bearing 1750 for main frame 1700 is generally half the distance between the bottom 1715 of top member 1710 and the bottom 1770 of bottom bracket mount 1765, and the location of pivot bearing along seat support member 1730 is halfway between the bottom 1715 of top member 1710 and the bottom 1770 of bottom bracket mount 1765. Thus the maximum first contact distance for a swingarm to be used with main frame 1700 to allow the swingarm to nest within main frame 1700 according to the invention is R5. Swingarm 1780 is an example of such a swingarm that has a first contact distance of R5.

Figure 18:
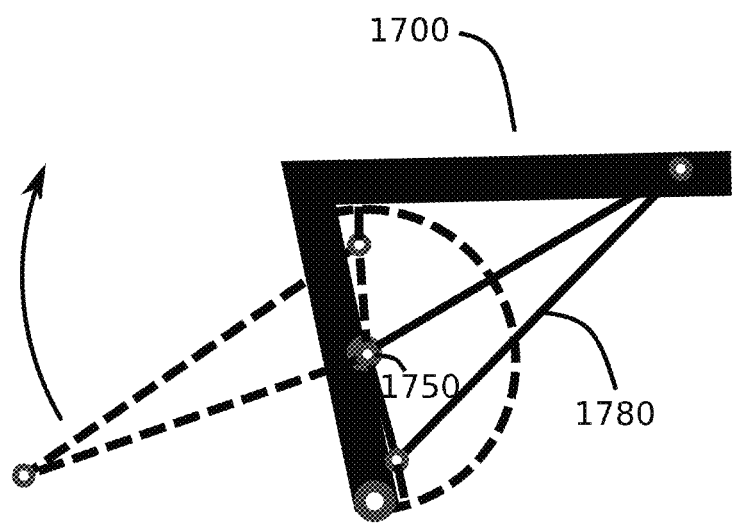
FIG. 18 is a side view of a schematic representation of a general embodiment of a main frame and swingarm of the invention showing the swingarm rotating to a nested position within the main frame.

FIG. 18 shows how swingarm 1780 can pivot around pivot bearing 1750 to nest within main frame 1700 according to the invention.

Figure 19:
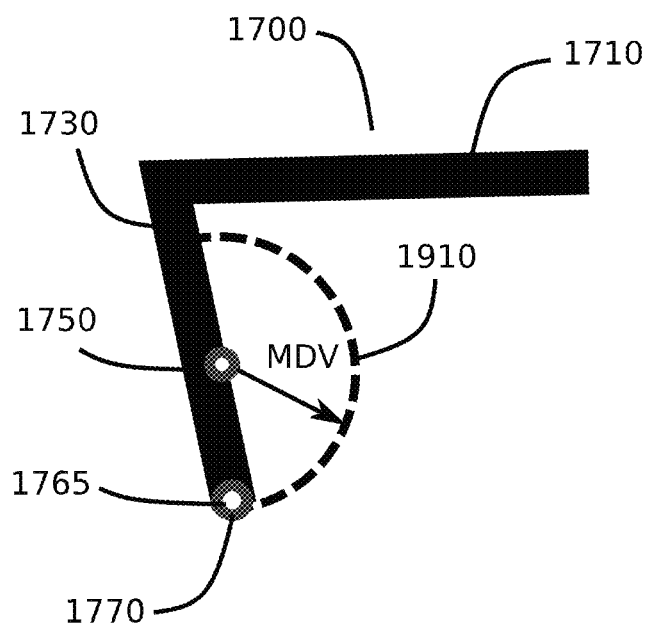
FIG. 19 is a side view of a schematic representation of a general embodiment of a main frame of the invention.

FIG. 19 shows an inscribed arc 1910 for main frame 1700 for a swingarm for which the MDV is less than R5 of FIG. 17. As shown in FIG. 19, for a swingarm with a first contact distance of MDV, pivot bearing 1750 can be lowered to a location on seat support member 1730 whose distance from bottom 1770 of bottom bearing 1765 is approximately equal to the MDV.

Thus, a novel swingarm suspension bicycle frame has been presented. Although the invention has been described using specific example embodiments, those of ordinary skill in the art will understand that the invention is not limited to the specific example embodiments described herein. Other embodiments will be apparent to those of ordinary skill in the art.

The invention claimed is:

1. A bicycle frame comprising:
a main frame, the main frame comprising:
a top member having a first front end and a first rear end;
a seat support member affixed to said first rear end of said top member, said seat support member comprising a first top end and a first bottom end;
a pivot bearing comprising a first pivot point mounted to said seat support member, said first pivot point being disposed a first distance from said first bottom end of said seat support member;
said bicycle frame further comprising a swingarm comprising a wheel mounting point for mounting to a rear wheel, a second pivot point for mounting to said pivot bearing, a fork support member having a second top end and a second bottom end affixed to said first front end of said top member; a bottom member having a second front end and a second rear end, said second front end affixed to said fork support member and said second rear end affixed to said seat support member such that said bottom member is disposed a first perpendicular distance from said first pivot point of said pivot bearing, and a shock absorber mounting point for mounting to a shock absorber, said shock absorber mounting point being disposed a second distance from said second pivot point of said swingarm;
wherein said first distance is no less than said second distance; wherein said first perpendicular distance is no less than said second distance; wherein said swingarm comprises a point of first contact that comprises a first point that contacts said bottom member when said swingarm pivots about said first pivot point of said pivot bearing, and wherein said first distance is no less than a third distance between said point of first contact and said second pivot point of said swingarm.

2. The bicycle frame of claim 1 wherein said pivot bearing is disposed such that said swingarm does not contact said top member prior to contacting said bottom member as said swingarm is pivoted about said first pivot point of said pivot bearing.

3. The bicycle frame of claim 1 wherein said point of first contact comprises said shock absorber mounting point.

4. A bicycle frame comprising:
a main frame, the main frame comprising:
a top member having a first front end and a first rear end;
a seat support member affixed to said first rear end of said top member, said seat support member comprising a first top end and a first bottom end;
a pivot bearing comprising a first pivot point mounted to said seat support member, said first pivot point being disposed a first distance from said first bottom end of said seat support member;
said bicycle frame further comprising a swingarm comprising a wheel mounting point for mounting to a rear wheel, a second pivot point for mounting to said pivot bearing, a fork support member having a second top end and a second bottom end affixed to said first front end of said top member; a bottom member having a second front end and a second rear end, said second front end affixed to said fork support member and said second rear end affixed to said seat support member such that said bottom member is disposed a first perpendicular distance from said first pivot point of said pivot bearing, and a shock absorber mounting point for mounting to a shock absorber, said shock absorber mounting point being disposed a second distance from said second pivot point of said swingarm;
wherein said first distance is no less than said second distance; wherein said first perpendicular distance is no less than said second distance; wherein said swingarm comprises a point of first contact that comprises a first point that contacts said bottom member when said swingarm pivots about said first pivot point of said pivot bearing, and wherein said first perpendicular distance is no less than a third distance between said point of first contact and said second pivot point of said swingarm.

5. The bicycle frame of claim 4 wherein said pivot bearing is disposed such that said swingarm does not contact said top member prior to contacting said bottom member as said swingarm is pivoted about said first pivot point of said pivot bearing.

6. The bicycle frame of claim 4 wherein said point of first contact comprises said shock absorber mounting point.

7. A method for nesting a swingarm comprising a pivot point within a main frame of a bicycle comprising a seat support member and a top member comprising the steps of:
mounting said pivot point of said swing arm to a pivot bearing mounted to said seat support member of said main frame and disposed such that no portion of said swingarm contacts any portion of said main frame other than said seat support member when said swingarm is pivoted about said pivot point so as to nest substantially within said main frame;
rotating said swingarm about said pivot point so as to nest substantially within said main frame;
wherein said swingarm further comprises a wheel mounting point and a first shock absorber mounting point, wherein said mainframe comprises a second shock absorber mounting point, wherein a shock absorber is mounted between said first and second shock absorber mounting points, and wherein said method comprises the step of disconnecting at least one of said first and second shock absorber mounting points from said shock absorber prior to rotating said swingarm about said pivot point so as to nest substantially within said main frame.

8. The method of claim 7 wherein said mainframe comprises a fork tube and a suspension fork mounted to said fork tube, and wherein said method further comprises compressing said suspension fork and maintaining said suspension fork in said compressed configuration.

* * * * *